US010021959B2

(12) United States Patent
Jimenez et al.

(10) Patent No.: US 10,021,959 B2
(45) Date of Patent: Jul. 17, 2018

(54) ORAL CARE IMPLEMENT HAVING MULTI-COMPONENT HANDLE

(71) Applicant: Colgate-Palmolive Company, New York, NY (US)

(72) Inventors: Eduardo Jimenez, Manalapan, NJ (US); Kenneth Waguespack, North Brunswick, NJ (US); Robert Moskovich, East Brunswick, NJ (US); Andreas Wechsler, Zell am See (AT); Joachim Storz, Zell am See (AT); Roger Kirchhofer, Lucerne (CH); Kurt Bieri, Lucerne (CH)

(73) Assignee: COLGATE-PALMOLIVE COMPANY, New York, NY (US)

( * ) Notice: Subject to any disclaimer, the term of this patent is extended or adjusted under 35 U.S.C. 154(b) by 0 days.

(21) Appl. No.: 15/539,480

(22) PCT Filed: Dec. 23, 2014

(86) PCT No.: PCT/US2014/072062
§ 371 (c)(1),
(2) Date: Jun. 23, 2017

(87) PCT Pub. No.: WO2016/105367
PCT Pub. Date: Jun. 30, 2016

(65) Prior Publication Data
US 2017/0347781 A1   Dec. 7, 2017

(51) Int. Cl.
A46B 5/02       (2006.01)
A46B 9/04       (2006.01)
B29L 31/42      (2006.01)

(52) U.S. Cl.
CPC .............. *A46B 5/021* (2013.01); *A46B 5/026* (2013.01); *A46B 9/04* (2013.01); *A46B 2200/1066* (2013.01); *B29L 2031/425* (2013.01)

(58) Field of Classification Search
CPC ........... A46B 5/021; A46B 5/026; A46B 9/04
See application file for complete search history.

(56) References Cited

U.S. PATENT DOCUMENTS 758,764 A    5/1904  MacLeod
846,900 A    3/1907  Bloom
(Continued)

FOREIGN PATENT DOCUMENTS

AR       71556     10/2003
AR       80042     11/2009
(Continued)

OTHER PUBLICATIONS

International Search Report and the Written Opinion issued in International Application PCT/US2010/046806 dated Mar. 16, 2011.
(Continued)

*Primary Examiner* — Randall Chin

(57) ABSTRACT

An oral care implement having a multi-component handle is disclosed. In one aspect, the oral care implement comprises: a handle; a head coupled to the handle; at least one tooth cleaning element extending from the head; the handle comprising: a first component constructed of a first hard material; and a second component constructed of a second hard material, the second component comprising a plurality of strips that collectively form a strap network that wraps around the first component.

17 Claims, 13 Drawing Sheets

(56) References Cited

U.S. PATENT DOCUMENTS

| | | |
|---|---|---|
| 1,125,532 A | 1/1915 | Himmel |
| 1,901,230 A | 3/1933 | Palmer |
| 1,924,152 A | 8/1933 | Coney et al. |
| 2,161,349 A | 6/1939 | Hadden |
| 2,186,005 A | 1/1940 | Casto |
| 2,305,461 A | 12/1942 | Spyra |
| 2,548,255 A * | 4/1951 | Cressler .................. A46B 5/02 15/104.94 |
| D273,635 S | 5/1984 | Stocchi |
| 4,517,701 A | 5/1985 | Stanford, Jr. |
| 4,958,402 A | 9/1990 | Weihrauch |
| 5,144,712 A | 9/1992 | Hansel et al. |
| 5,339,482 A | 8/1994 | Desimone et al. |
| 5,392,483 A | 2/1995 | Heinzelman et al. |
| 5,584,690 A | 12/1996 | Maassarani |
| 5,604,951 A | 2/1997 | Shipp |
| 5,628,082 A | 5/1997 | Moskovich |
| 5,651,158 A | 7/1997 | Halm |
| D390,706 S | 2/1998 | Hohlbein et al. |
| 5,735,012 A | 4/1998 | Heinzelman et al. |
| 5,746,532 A | 5/1998 | Megill et al. |
| 5,758,383 A | 6/1998 | Hohlbein |
| 5,781,958 A | 7/1998 | Meessmann et al. |
| 5,799,353 A | 9/1998 | Yamamoto et al. |
| 5,802,656 A | 9/1998 | Dawson et al. |
| 5,839,149 A | 11/1998 | Scheier et al. |
| D404,205 S | 1/1999 | Hohlbein |
| D404,206 S | 1/1999 | Hohlbein |
| 5,862,559 A | 1/1999 | Hunter |
| 5,863,102 A | 1/1999 | Waguespack et al. |
| 5,908,038 A | 6/1999 | Bennett |
| 5,915,868 A | 6/1999 | Frazell |
| 5,930,860 A | 8/1999 | Shipp |
| 5,946,758 A | 9/1999 | Hohlbein et al. |
| 5,967,152 A | 10/1999 | Rimkus |
| 5,970,564 A | 10/1999 | Inns et al. |
| 5,984,935 A | 11/1999 | Budei et al. |
| 5,991,958 A | 11/1999 | Hohlbein |
| 6,015,293 A | 1/2000 | Rimkus |
| 6,032,313 A | 3/2000 | Tsang |
| 6,041,468 A | 3/2000 | Chen et al. |
| 6,073,299 A | 6/2000 | Hohlbein |
| 6,088,870 A | 7/2000 | Hohlbein |
| D429,887 S | 8/2000 | Hohlbein et al. |
| 6,099,780 A | 8/2000 | Gellert |
| 6,131,228 A | 10/2000 | Chen et al. |
| 6,178,583 B1 | 1/2001 | Volpenhein |
| 6,234,798 B1 | 5/2001 | Salazar et al. |
| 6,276,021 B1 | 8/2001 | Hohlbein |
| 6,292,973 B1 | 9/2001 | Moskovich et al. |
| D450,457 S | 11/2001 | Hohlbein |
| D450,929 S | 11/2001 | Angelini et al. |
| 6,314,606 B1 | 11/2001 | Hohlbein |
| D451,286 S | 12/2001 | Hohlbein |
| D456,138 S | 4/2002 | Hohlbein |
| D456,139 S | 4/2002 | Hohlbein |
| 6,370,726 B1 | 4/2002 | Kini et al. |
| D457,323 S | 5/2002 | Hohlbein |
| 6,397,425 B1 | 6/2002 | Szczech et al. |
| 6,408,476 B1 | 6/2002 | Cann |
| 6,421,867 B1 | 7/2002 | Weihrauch |
| D461,313 S | 8/2002 | Hohlbein |
| 6,442,786 B2 | 9/2002 | Halm |
| 6,442,787 B2 | 9/2002 | Hohlbein |
| D464,133 S | 10/2002 | Barnett et al. |
| 6,463,618 B1 | 10/2002 | Zimmer |
| D474,608 S | 5/2003 | Hohlbein |
| 6,564,416 B1 | 5/2003 | Claire et al. |
| 6,596,213 B2 | 6/2003 | Swenson |
| 6,595,087 B2 | 7/2003 | Whalen et al. |
| 6,599,048 B2 | 7/2003 | Kuo |
| 6,601,272 B2 | 8/2003 | Stvartak et al. |
| 6,658,688 B2 | 12/2003 | Gavney, Jr. |
| D486,649 S | 2/2004 | Sprosta et al. |
| 6,687,940 B1 | 2/2004 | Gross et al. |
| 6,749,788 B1 | 6/2004 | Holden et al. |
| 6,766,549 B2 | 7/2004 | Klupt |
| 6,792,642 B2 | 9/2004 | Wagstaff |
| 6,820,299 B2 | 11/2004 | Gavney, Jr. |
| 6,820,300 B2 | 11/2004 | Gavney, Jr. |
| 6,859,969 B2 | 3/2005 | Gavney, Jr. et al. |
| D503,538 S | 4/2005 | Desalvo |
| 6,886,207 B1 | 5/2005 | Solanki |
| 6,889,405 B2 | 5/2005 | Ritrovato et al. |
| 6,919,038 B2 | 7/2005 | Meyer et al. |
| 6,957,469 B2 | 10/2005 | Davies |
| D511,249 S | 11/2005 | Hohlbein |
| 6,972,106 B2 | 12/2005 | Huber et al. |
| D513,882 S | 1/2006 | Hohlbein et al. |
| 6,983,507 B2 | 1/2006 | McDougall |
| D514,320 S | 2/2006 | Hohlbein |
| D514,812 S | 2/2006 | Hohlbein et al. |
| 6,996,870 B2 | 2/2006 | Hohlbein |
| D516,819 S | 3/2006 | Hohlbein |
| D517,812 S | 3/2006 | Hohlbein et al. |
| D517,813 S | 3/2006 | Hohlbein et al. |
| 7,007,332 B2 | 3/2006 | Hohlbein |
| 7,020,928 B2 | 4/2006 | Hohlbein |
| D520,753 S | 5/2006 | Hohlbein |
| 7,047,591 B2 | 5/2006 | Hohlbein |
| 7,069,615 B2 | 7/2006 | Gavney, Jr. |
| 7,073,225 B1 | 7/2006 | Ford |
| D526,487 S | 8/2006 | Chenvainu et al. |
| 7,083,756 B2 | 8/2006 | Strahler |
| 7,089,621 B2 | 8/2006 | Hohlbein |
| D527,528 S | 9/2006 | Hohlbein |
| D528,803 S | 9/2006 | Hohlbein |
| D532,202 S | 11/2006 | Hohlbein |
| D532,607 S | 11/2006 | Hohlbein |
| 7,143,462 B2 | 12/2006 | Hohlbein |
| 7,146,675 B2 | 12/2006 | Ansari et al. |
| 7,168,125 B2 | 1/2007 | Hohlbein |
| 7,181,799 B2 | 2/2007 | Gavney, Jr. et al. |
| 7,182,542 B2 | 2/2007 | Hohlbein |
| 7,213,288 B2 | 5/2007 | Hohlbein |
| 7,219,384 B2 | 5/2007 | Hohlbein |
| 7,273,327 B2 | 9/2007 | Hohlbein et al. |
| D557,504 S | 12/2007 | Hohlbein |
| D557,505 S | 12/2007 | Hohlbein |
| 7,322,067 B2 | 1/2008 | Hohlbein |
| D562,560 S | 2/2008 | Hohlbein |
| 7,331,731 B2 | 2/2008 | Hohlbein et al. |
| 7,354,112 B2 | 4/2008 | Fischer et al. |
| 7,383,619 B2 | 6/2008 | Gross et al. |
| 7,386,909 B2 | 6/2008 | Hohlbein |
| 7,415,788 B2 | 8/2008 | Little |
| 7,458,125 B2 | 12/2008 | Hohlbein |
| 7,472,448 B2 | 1/2009 | Hohlbein et al. |
| 7,478,959 B2 | 1/2009 | Hohlbein |
| 7,480,955 B2 | 1/2009 | Hohlbein et al. |
| D589,260 S | 3/2009 | Hohlbein |
| 7,540,844 B2 | 6/2009 | Muser |
| D598,199 S | 8/2009 | Russell et al. |
| D598,654 S | 8/2009 | Huang |
| D599,556 S | 9/2009 | Russell et al. |
| 7,614,111 B2 | 11/2009 | Moskovich et al. |
| D609,915 S | 2/2010 | Erskine-Smith et al. |
| D612,611 S | 3/2010 | Brown, Jr. et al. |
| 7,712,175 B2 | 5/2010 | Blanchard et al. |
| 7,721,376 B2 | 5/2010 | Hohlbein et al. |
| 7,722,274 B2 | 5/2010 | Hohlbein et al. |
| 7,735,174 B2 | 6/2010 | Hohlbein et al. |
| D623,415 S | 9/2010 | Geiberger |
| 7,788,756 B2 | 9/2010 | Kraemer |
| 7,845,042 B2 | 12/2010 | Moskovich et al. |
| 7,854,036 B2 | 12/2010 | Georgi |
| 7,937,794 B2 | 5/2011 | Huber et al. |
| 7,954,191 B2 | 6/2011 | Hohlbein |
| 7,958,589 B2 | 6/2011 | Braun et al. |
| 7,975,343 B2 | 7/2011 | Hohlbein et al. |
| 7,975,346 B2 | 7/2011 | Moskovch et al. |
| 7,979,947 B2 | 7/2011 | Storkel et al. |
| 8,032,991 B2 | 10/2011 | Lawless |
| 8,042,217 B2 | 10/2011 | Sorrentino |

(56) References Cited

U.S. PATENT DOCUMENTS

| | | | |
|---|---|---|---|
| 8,046,864 B2 | 11/2011 | Baertschi et al. | |
| 8,060,972 B2 | 11/2011 | Geiberger et al. | |
| 8,083,980 B2 | 12/2011 | Huber et al. | |
| 8,239,996 B2 | 8/2012 | Garber et al. | |
| 8,307,488 B2 | 11/2012 | Pfenniger et al. | |
| 8,327,492 B2 | 12/2012 | Cann | |
| 8,332,982 B2 | 12/2012 | Braun et al. | |
| 8,332,985 B2 | 12/2012 | Solanki | |
| 8,382,208 B2 | 2/2013 | Baertschi et al. | |
| 8,448,284 B2 | 5/2013 | Gross et al. | |
| 8,448,287 B2 | 5/2013 | Ponzini et al. | |
| 8,458,846 B2 | 6/2013 | Schamberg et al. | |
| 8,484,789 B2 | 7/2013 | Claire-Zimmet et al. | |
| 8,500,766 B2 | 8/2013 | Jimenez et al. | |
| 8,528,148 B2 | 9/2013 | Brown, Jr. et al. | |
| 8,595,886 B2 | 12/2013 | Edelstein et al. | |
| 8,601,635 B2 | 12/2013 | Goldman et al. | |
| 8,608,251 B2 | 12/2013 | Nirwing et al. | |
| 8,621,698 B2 | 1/2014 | Chenvainu et al. | |
| 8,631,534 B2 | 1/2014 | Blanchard et al. | |
| 8,732,890 B2 | 5/2014 | Mohr et al. | |
| 8,739,351 B2 | 6/2014 | Kling et al. | |
| 8,776,302 B2 | 7/2014 | Baertschi et al. | |
| 8,813,292 B2 | 8/2014 | Driesen et al. | |
| 2002/0017003 A1 | 2/2002 | Kramer et al. | |
| 2002/0138928 A1 | 10/2002 | Calabrese | |
| 2002/0138931 A1* | 10/2002 | Davies | A46B 5/02 15/167.1 |
| 2003/0163881 A1 | 9/2003 | Driesen et al. | |
| 2003/0178745 A1 | 9/2003 | Scarabelli et al. | |
| 2003/0178885 A1 | 9/2003 | Weihrauch | |
| 2004/0025275 A1 | 2/2004 | Moskovich et al. | |
| 2004/0107521 A1 | 6/2004 | Chan et al. | |
| 2004/0134007 A1 | 7/2004 | Davies | |
| 2005/0166343 A1 | 8/2005 | Gavney, Jr. | |
| 2005/0210612 A1 | 9/2005 | Hohlbein et al. | |
| 2006/0048314 A1 | 3/2006 | Kressner | |
| 2006/0048323 A1 | 3/2006 | Rueb | |
| 2006/0064827 A1 | 3/2006 | Chan | |
| 2006/0123574 A1 | 6/2006 | Storkel et al. | |
| 2006/0236477 A1 | 10/2006 | Gavney, Jr. | |
| 2006/0236478 A1 | 10/2006 | Hohlbein et al. | |
| 2006/0248667 A1 | 11/2006 | Kraemer | |
| 2007/0151058 A1 | 7/2007 | Kraemer et al. | |
| 2007/0169295 A1 | 7/2007 | Winter et al. | |
| 2007/0265555 A1 | 11/2007 | Deng | |
| 2007/0283517 A1 | 12/2007 | Blanchard et al. | |
| 2009/0007357 A1 | 1/2009 | Meadows et al. | |
| 2009/0038097 A1 | 2/2009 | Geiberger | |
| 2009/0158543 A1 | 6/2009 | Lee | |
| 2009/0183331 A1* | 7/2009 | Gross | A46B 5/02 15/167.1 |
| 2009/0255077 A1 | 10/2009 | Mori et al. | |
| 2010/0043162 A1 | 2/2010 | Kling et al. | |
| 2010/0058550 A1 | 3/2010 | Ballmaier et al. | |
| 2010/0088836 A1 | 4/2010 | Kirchhofer et al. | |
| 2010/0101037 A1 | 4/2010 | Hilfiker et al. | |
| 2010/0115724 A1 | 5/2010 | Huang | |
| 2010/0180392 A1 | 7/2010 | Binet et al. | |
| 2010/0223746 A1 | 9/2010 | Mueller | |
| 2010/0263149 A1 | 10/2010 | Ballmaier et al. | |
| 2010/0306941 A1 | 12/2010 | Erskine-Smith et al. | |
| 2011/0030160 A1 | 2/2011 | Knutzen et al. | |
| 2011/0047736 A1 | 3/2011 | Jimenez et al. | |
| 2011/0138560 A1 | 6/2011 | Vitt et al. | |
| 2011/0219558 A1 | 9/2011 | Vitt et al. | |
| 2011/0109149 A1 | 12/2011 | Loetscher et al. | |
| 2012/0034576 A1 | 2/2012 | Mostafa | |
| 2012/0192369 A1 | 8/2012 | Mohr et al. | |
| 2012/0255136 A1 | 11/2012 | Jimenez et al. | |
| 2013/0007968 A1 | 1/2013 | Driesen et al. | |
| 2013/0036566 A1 | 2/2013 | Schlatter | |
| 2013/0139338 A1 | 6/2013 | Hess et al. | |
| 2013/0269128 A1 | 10/2013 | Jimenez | |
| 2013/0291320 A1 | 11/2013 | Kirchhofer et al. | |
| 2013/0333126 A1 | 12/2013 | Miller | |
| 2014/0047656 A1 | 2/2014 | Newman et al. | |
| 2014/0158152 A1 | 6/2014 | Kirchhofer et al. | |
| 2014/0173838 A1 | 6/2014 | Dickie et al. | |
| 2014/0173853 A1 | 6/2014 | Kirchhofer et al. | |
| 2014/0298605 A1 | 10/2014 | Ivory | |
| 2014/0310901 A1 | 10/2014 | Geiberger et al. | |

FOREIGN PATENT DOCUMENTS

| | | |
|---|---|---|
| BR | 7900283 | 8/2000 |
| BR | DI 6601454-9 | 4/2006 |
| BR | DI 6702593 | 8/2007 |
| BR | DI 6805210-3 | 11/2008 |
| BR | DI 6902120-1 | 5/2009 |
| BR | DI 6903329-3 | 8/2009 |
| BR | DI 6903330-7 | 8/2009 |
| BR | DI 6904386 | 11/2009 |
| BR | DI 7102178-7 | 4/2011 |
| BR | 30 2013 000448-1 | 2/2013 |
| BR | DI 6401609-9 | 5/2014 |
| CH | 215110 | 6/1941 |
| CN | 3372860D | 6/2004 |
| CN | 3372861D | 6/2004 |
| CN | 2732059 | 10/2005 |
| CN | 300704339 | 10/2007 |
| CN | 201294969 | 8/2009 |
| CN | 201518876 | 7/2010 |
| CN | 201518877 | 7/2010 |
| CN | 201518880 | 7/2010 |
| CN | 201528796 | 7/2010 |
| CN | 201541995 | 8/2010 |
| CN | 201541996 | 8/2010 |
| CN | 201541997 | 8/2010 |
| CN | 201550827 | 8/2010 |
| CN | 301406316 S | 12/2010 |
| CN | 301421505 S | 12/2010 |
| CN | 201814085 | 5/2011 |
| CN | 201986933 | 9/2011 |
| CN | 301763519 | 12/2011 |
| CN | 30198826 | 5/2012 |
| CN | 302058056 | 9/2012 |
| CN | 302225957 S | 12/2012 |
| CN | 302328863 S | 2/2013 |
| CN | 202800555 | 3/2013 |
| CN | 103005839 | 4/2013 |
| CN | 203194906 | 9/2013 |
| CN | 203220069 | 10/2013 |
| CN | 203220073 | 10/2013 |
| CN | 203252150 | 10/2013 |
| CN | 302956580 S | 10/2014 |
| DE | 19858102 | 6/2000 |
| DE | 202005009026 | 10/2005 |
| DE | 102006016939 | 5/2007 |
| DE | 102006005616 | 8/2007 |
| DE | 102006024874 | 11/2007 |
| DE | 202008016004 | 2/2009 |
| EM | 000366984-0001 | 7/2005 |
| EM | 000638028-0002 | 12/2006 |
| EM | 001975079-0005 | 1/2012 |
| EM | 002163675-0002 | 1/2013 |
| EM | 002163675-0003 | 1/2013 |
| EM | 002212522-0004 | 4/2013 |
| EM | 002212522-0012 | 4/2013 |
| EM | 002424069-0001 | 3/2014 |
| EP | 0716821 | 6/1996 |
| EP | 0769920 | 9/2003 |
| EP | 2810581 | 12/2014 |
| ES | 1063617 | 11/2006 |
| IT | 2010PDO000035-0019 | 10/2010 |
| JP | H08164025 | 6/1996 |
| JP | 10042957 | 8/1996 |
| JP | D1314270 | 10/2007 |
| KR | 20040032038 | 4/2004 |
| KR | 838174 | 6/2007 |
| KR | 20-2012-0005449 | 7/2012 |
| MX | 32553 | 11/2009 |
| MX | 36113 | 4/2011 |
| MX | 36650 | 4/2011 |

(56) References Cited

FOREIGN PATENT DOCUMENTS

| | | |
|---|---|---|
| RU | 55985 | 1/2005 |
| RU | 79787 | 10/2011 |
| RU | 80086 | 11/2011 |
| RU | 81915 | 6/2012 |
| WO | WO1995/06420 | 3/1995 |
| WO | WO1995/10959 | 4/1995 |
| WO | WO1999/023910 | 5/1999 |
| WO | WO1999/55514 | 11/1999 |
| WO | WO1999/65358 | 12/1999 |
| WO | WO2000/49911 | 8/2000 |
| WO | WO2001/17392 | 3/2001 |
| WO | WO2001/29128 | 4/2001 |
| WO | WO2001/45573 | 6/2001 |
| WO | WO2001/182741 | 11/2001 |
| WO | WO2004/043669 | 5/2004 |
| WO | WO2005/122827 | 12/2005 |
| WO | WO2008/017996 | 2/2008 |
| WO | WO2011/070549 | 6/2011 |
| WO | WO2011/075133 | 6/2011 |
| WO | WO2012/017923 | 2/2012 |
| WO | WO2012/115035 | 8/2012 |
| WO | WO2012/176741 | 12/2012 |
| WO | WO2013/031685 | 3/2013 |

OTHER PUBLICATIONS

International Search Report and the Written Opinion issued in International Application PCT/US2012/070760 dated Oct. 14, 2013.
International Search Report and the Written Opinion issued in International Application PCT/US2014/072062 dated Sep. 22, 2015.

\* cited by examiner

ORAL CARE IMPLEMENT HAVING MULTI-COMPONENT HANDLE

BACKGROUND

Oral care implements, such as toothbrushes, are mass-produced articles and must therefore allow cost-effective production. Toothbrushes made of a single plastic material and toothbrushes made of two plastic components, which are produced for example by a two component injection molding process, are known. In the latter case, known toothbrushes generally comprise two parts: a first part made of a hard plastic material, for example polypropylene; and a second part made of a resilient plastic material, for example a thermoplastic elastomer. Typically, the first part, which is made of the hard plastic material, forms the structural portion of the handle and has a recess or channel formed therein. This recess is filled with the resilient plastic material, thereby forming the second part which acts as a gripping surface or cover.

The hard plastic and the resilient soft plastic are selected so that they bond with one another at the surface where the two plastic parts touch. In comparison with a toothbrush made of only one plastic material, this provides greater scope for design. Since, however, the two plastic materials have to bond with one another during the injection-molding operation, there are restrictions in the selection of the plastic materials and consequently in the design of the toothbrush.

One solution to the limitation that two plastic materials must bond with one another during the injection molding operation has been introduced by which a handle can be formed by two plastics that do not chemically bond within one another during the injection molding operation but rather utilize a mechanical connection, such as by interfitting portions of the two plastic components or by shrinking one plastic component about the other.

A need exists for an oral care implement, and method of manufacturing the same, that has a handle having greater design flexibility, is more cost-effective to mass produce, and/or affords comfort and control to the user during use.

BRIEF SUMMARY

Exemplary embodiments according to the present disclosure are directed to oral care implements having a multi-component handle.

In one aspect, the invention can be an oral care implement comprising an oral care implement comprising: a handle extending along a longitudinal axis; a head at a distal end of the handle; at least one tooth cleaning element extending from the head; the handle comprising: a first component constructed of a first hard plastic, the first component comprising a first component aperture; a second component constructed of a second hard plastic, the second component comprising the head and an anchor, the anchor located within the first component aperture and comprising a second component aperture; and a third component constructed of a first elastomeric material, the third component located within the second component aperture.

In another aspect, the invention can be an oral care implement comprising: a handle extending along a longitudinal axis; a head coupled to the handle; at least one tooth cleaning element extending from the head; the handle comprising: a first component constructed of a first hard material, the first component comprising a first component aperture; a second component constructed of a second hard material, the second component comprising the head and an anchor, the anchor located within the first component aperture and comprising a second component aperture; and a third component disposed within the second component aperture.

In yet another aspect, the invention can be a method of forming an oral care implement comprising: forming a first component of a first hard plastic, the first component having a first component aperture; forming a second component of a second hard plastic on the first component so that an anchor of the second component is located within the first component aperture, the anchor comprising a second component aperture; and forming a third component of a first elastomeric material in the second component aperture.

In a further aspect, the invention may be an oral care implement comprising: a handle extending along a longitudinal axis; a head at the distal end of the handle; at least one tooth cleaning element extending from the head; the handle comprising: a first component constructed of a first hard plastic; and a second component constructed of a second hard plastic, the second component comprising a body portion and a plurality of strips extending from the body portion and forming a strap network that wraps around the first component.

In an even further aspect, the invention can be an oral care implement comprising: a handle; a head coupled to the handle; at least one tooth cleaning element extending from the head; the handle comprising: a first component constructed of a first hard material; and a second component constructed of a second hard material, the second component comprising a plurality of strips that collectively form a strap network that wraps around the first component.

In a still further aspect, the invention can be a method of forming an oral care implement comprising: forming a first component of a first hard plastic; and forming a second component of a second hard plastic on the first component, the second component comprising: a plurality of strips that form a strap network that wraps around the first component; and a portion extending from a distal end of the first component, the portion comprising a head of the oral care implement.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
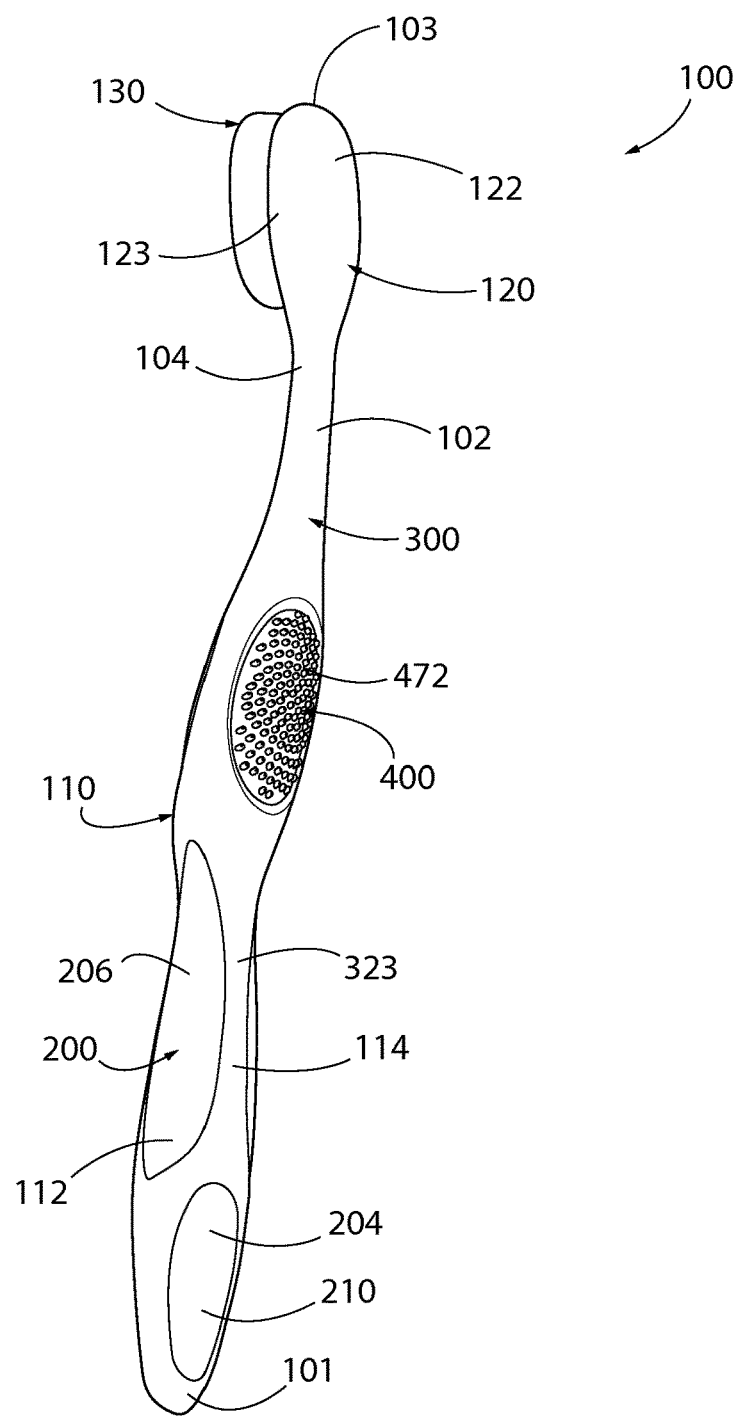
FIG. 1 is a rear perspective view of an oral care implement according to an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

In the following description, the invention is discussed in terms of a manual toothbrush, and method of manufacturing the same, having the inventive multi-component handle. However, in other forms, the invention could be in the form of other oral care implements including a soft-tissue cleansing implement, an inter-proximal pick, a flossing tool, a plaque scraper, a powered toothbrush, or other ansate implement designed for oral care. It is also to be understood that other embodiments may be utilized, and that structural and functional modifications may be made without departing from the scope of the present invention.

Figure 2:
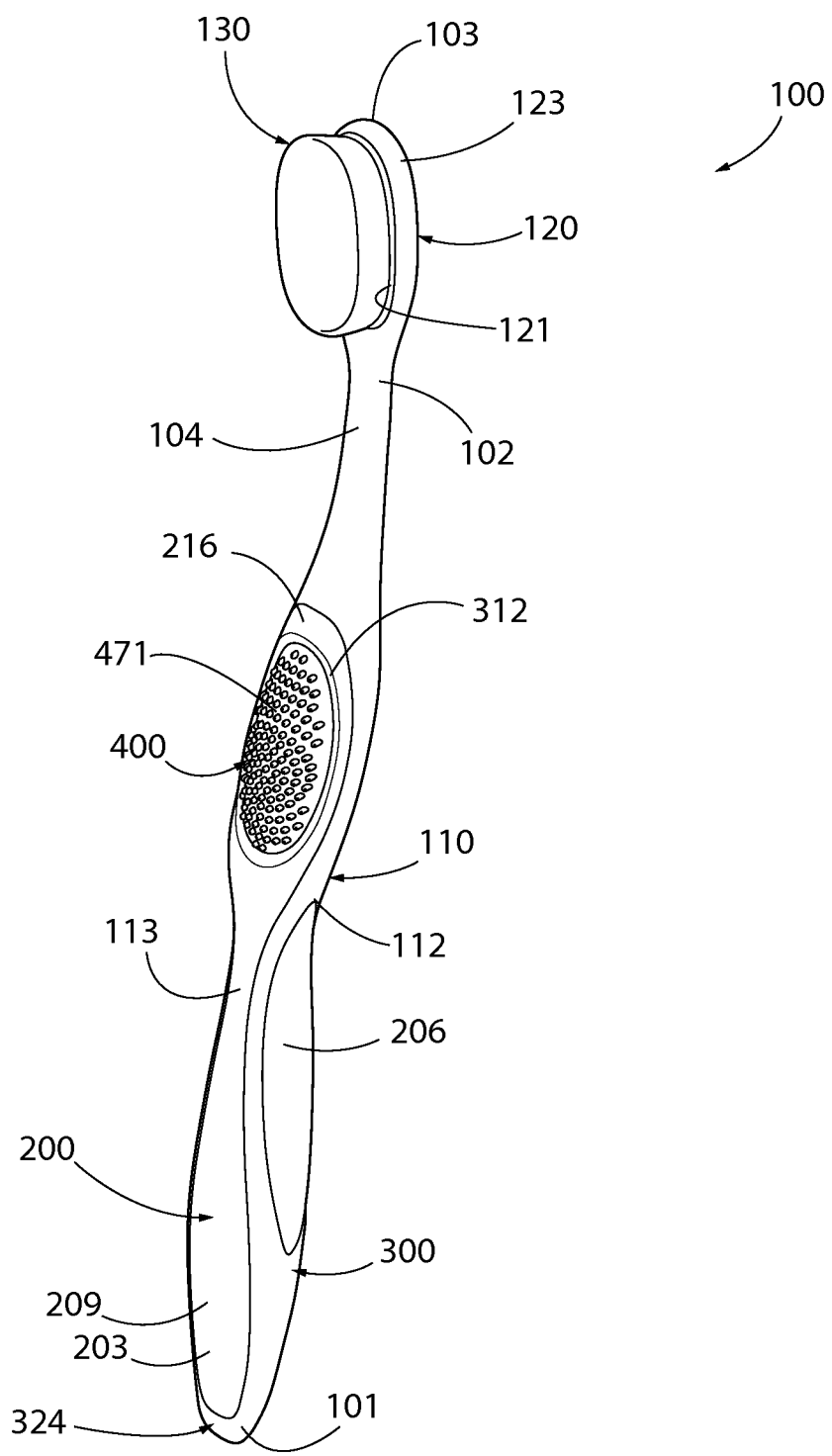
FIG. 2 is a front perspective view of the oral care implement of FIG. 1.
Figure 3:
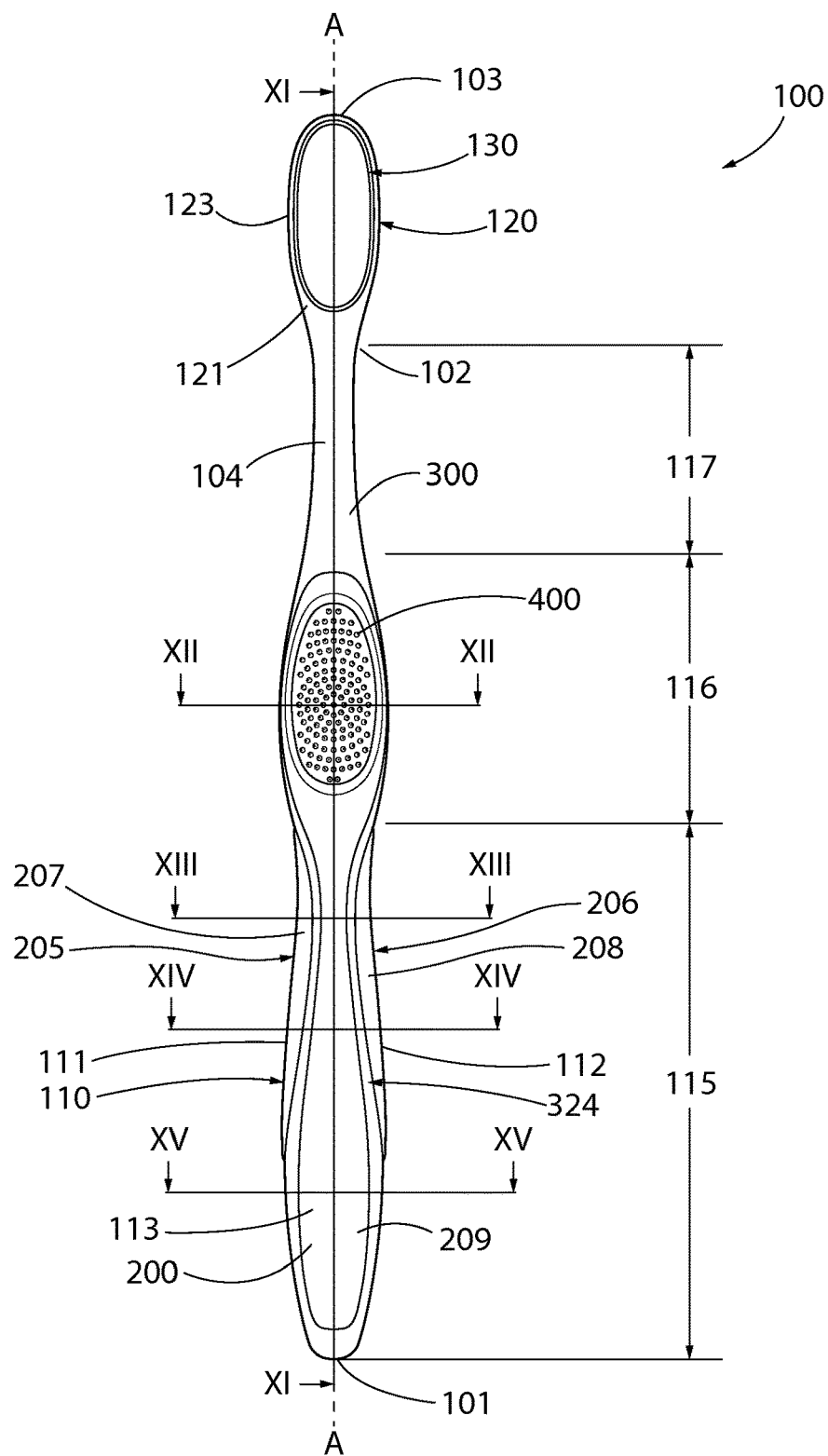
FIG. 3 is a front view of the oral care implement of FIG. 1.
Figure 4:
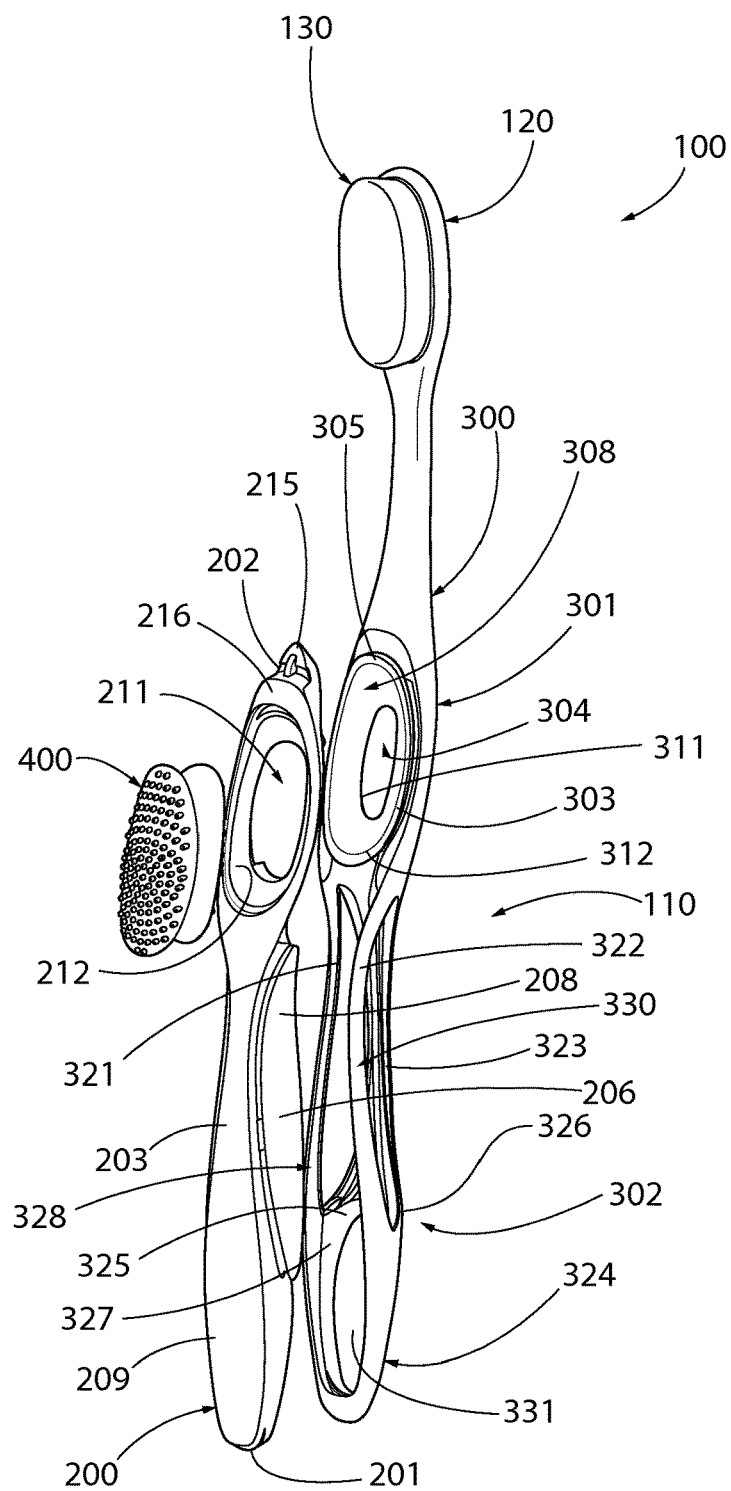
FIG. 4 is a front perspective of the oral care implement of FIG. 1 with the handle in an exploded state.
Figure 5:
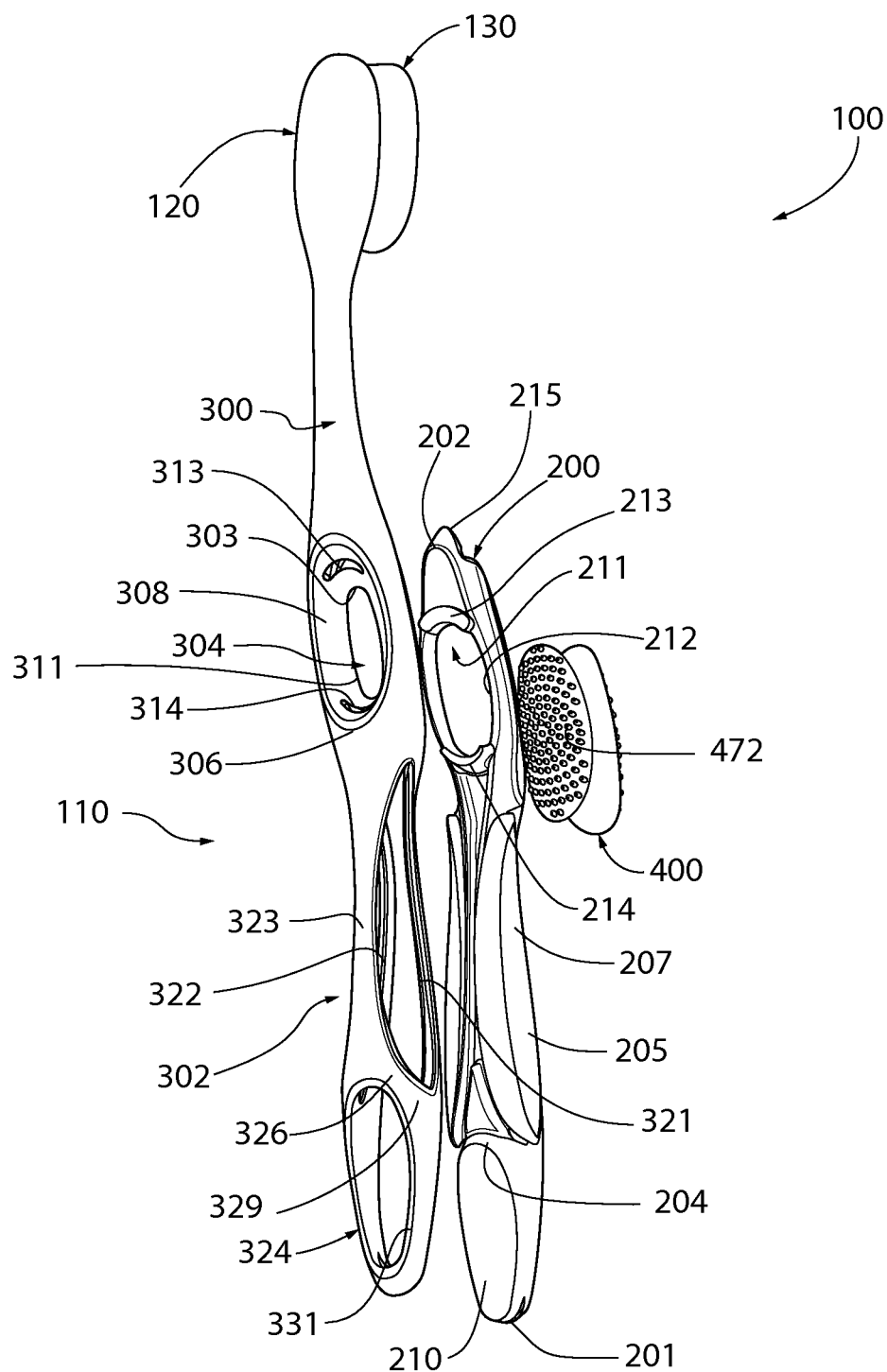
FIG. 5 is a rear perspective of the oral care implement of FIG. 1 with the handle in an exploded state.
Figure 6:
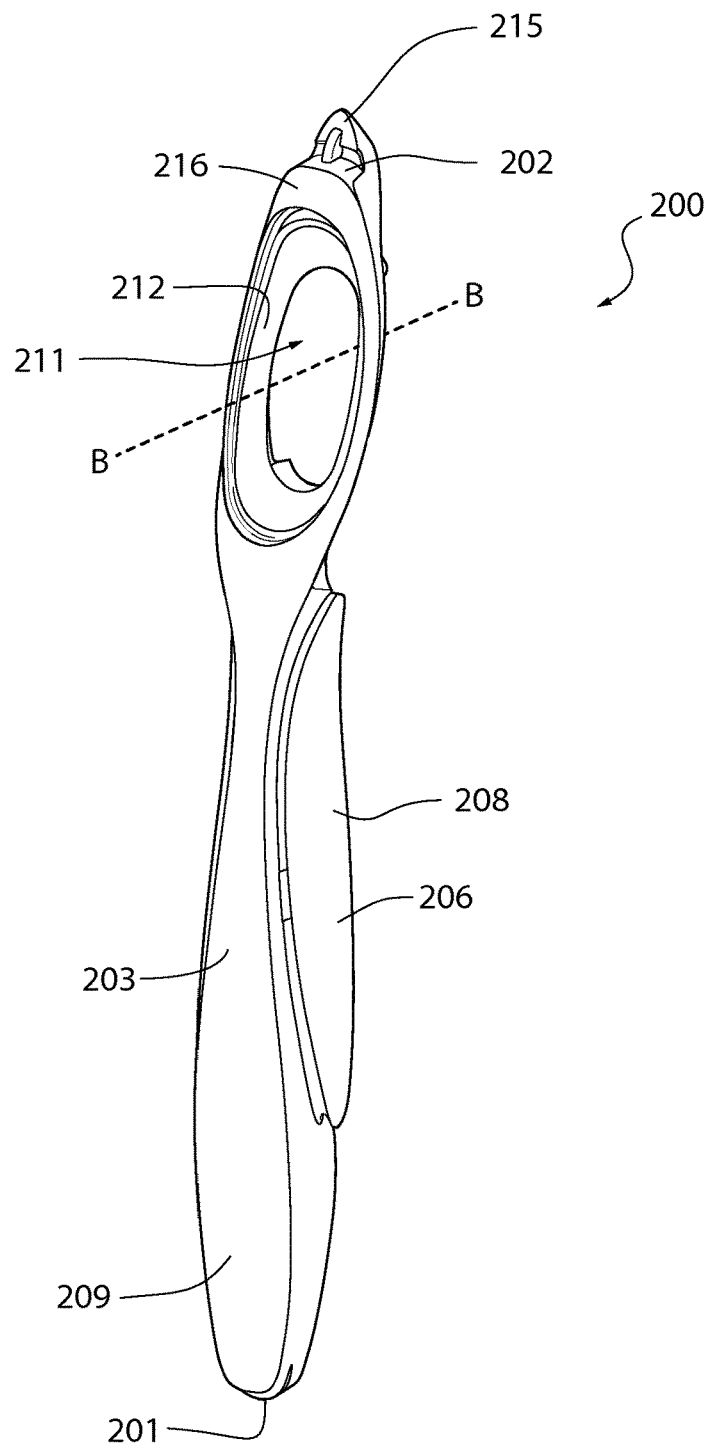
FIG. 6 is a front perspective view of a first component of the handle of the oral care implement of FIG. 1.

Referring first to FIGS. 1-3 concurrently, a toothbrush 100 is illustrated according to one embodiment of the present invention. The toothbrush 100 generally comprises a handle 110 and a head 120. The handle 110 provides the user with a mechanism by which he/she can readily grip and manipulate the toothbrush 100. The handle 110 includes ergonomic features which provide a high degree of control for the user while maintaining comfort. The head 120 is connected to a distal end 102 of the handle 110 and includes a set of teeth cleaning elements 130, which are generically illustrated.

Generally, the toothbrush 100 extends from a proximal end 101 (which is also the proximal end of the handle 110) to a distal end 103 along a longitudinal axis A-A (illustrated in FIG. 3). Conceptually, the longitudinal axis A-A is a reference line that is generally coextensive with the three-dimensional center line of the handle 110 (and the body of the head 120). Because the handle 110 is a non-linear structure (as can be seen in FIGS. 1 and 2) in the illustrated embodiment, the longitudinal axis A-A for toothbrush 100 is also non-linear in the illustrated embodiment. However, the invention is not so limited, and in certain embodiments, the toothbrush may have a simple linear arrangement and thus a substantially linear longitudinal axis A-A. As best visible in FIG. 12-15, the handle 110 has a generally elliptical transverse cross-sectional shape along its longitudinal length. Other transverse cross-sectional shapes can be used in other embodiments.

The head 120 is connected to the distal end 102 of the handle 110. As discussed in greater detail below, the head 120 and the handle 110 of the toothbrush 100 are preferably formed as a single-component integral structure using an injection molding process, which in the exemplified embodiment is the second component 300. More specifically, in the exemplified embodiment, the head 120 is integrally formed as part of the second component 300 of the handle 110. The second component 300 also comprises the neck 104 of the toothbrush 100. As exemplified, the neck is a portion of the handle 110 of the toothbrush 100 that is narrowed relative to the head 120 and the gripping portion of the handle 110.

In other embodiments, the handle 110 and the head 120 may be formed as separate components which are operably connected at a later stage of the manufacturing process by any suitable technique known in the art, including without limitation thermal welding, sonic welding, a tight-fit assembly, a coupling sleeve, adhesion, or fasteners. Whether the head 120 is integrally formed as part of the second component 300 of the handle 110 or is a multi-piece assembly (including connection techniques) is not limiting of the present invention in all embodiments. Furthermore, other manufacturing techniques may be used in place of and/or in addition to injection molding to create the handle 110 and/or the head 120 (or components thereof), such as milling and/or machining.

The head 120 generally comprises a front surface 121 and a rear surface 122. The front surface 121 and the rear surface 122 of the head 120 can take on a wide variety of shapes and contours, none of which are limiting of the present invention. For example, the front and rear surfaces 121, 122 can be planar, contoured or combinations thereof. The front surface 121 and rear surface 122 are bound by a peripheral surface 123.

The set of tooth cleaning elements 130, which are generically illustrated as a block, are provided on and extend outward from the front surface 121 of the head 120 for cleaning contact with an oral surface, preferably teeth. While the set of tooth cleaning elements 130 is particularly suited for brushing teeth, the set of tooth cleaning elements 130 can also be used to clean oral soft tissue, such as a tongue, gums, or cheeks instead of or in addition to teeth.

Common examples of "tooth cleaning elements" include, without limitation, filament bristles, fiber bristles, nylon bristles, spiral bristles, core-sheath bristles, rubber bristles, elastomeric protrusions, flexible polymer protrusions, co-extruded filaments, flag bristles, crimped bristles, anti-bacterial bristles and combinations thereof and/or structures containing such materials or combinations.

Figure 9:
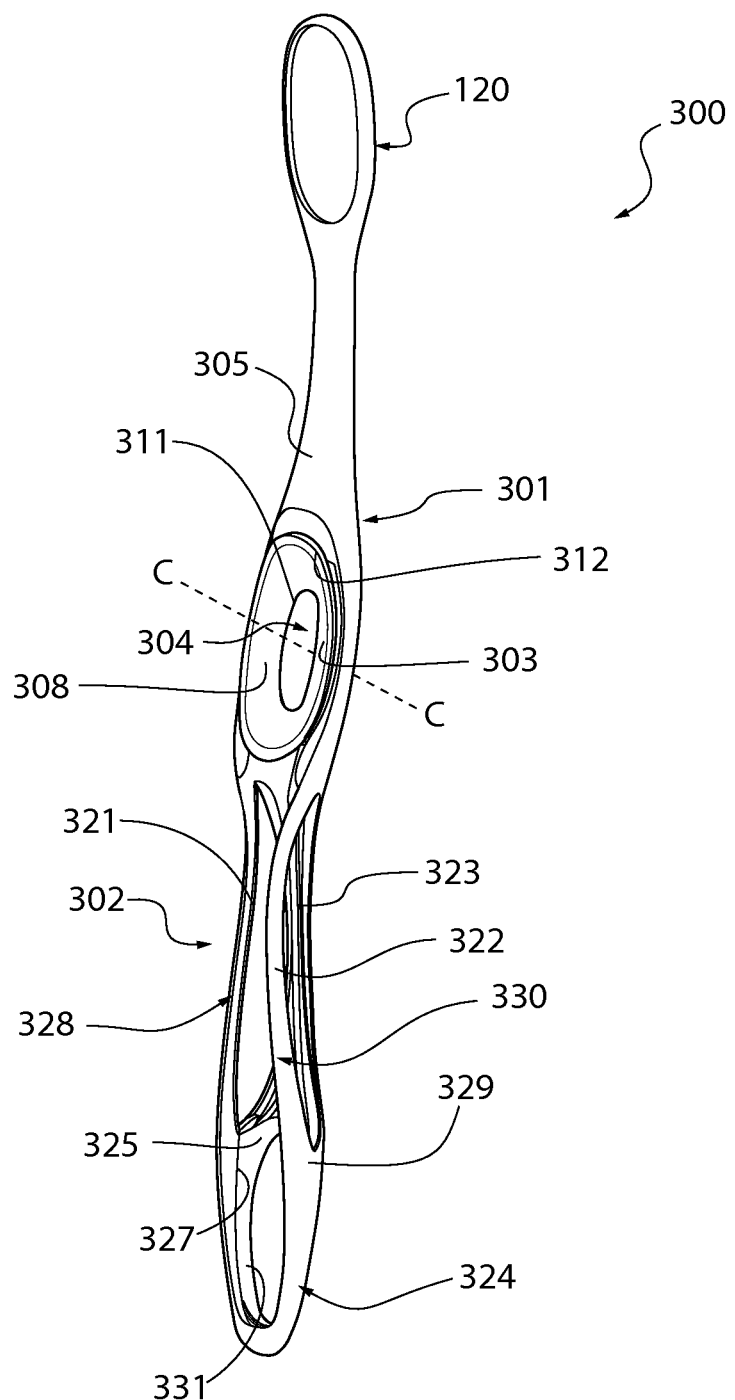
FIG. 9 is a front perspective view of a second component of the handle of the oral care implement of FIG. 1.
Figure 10:
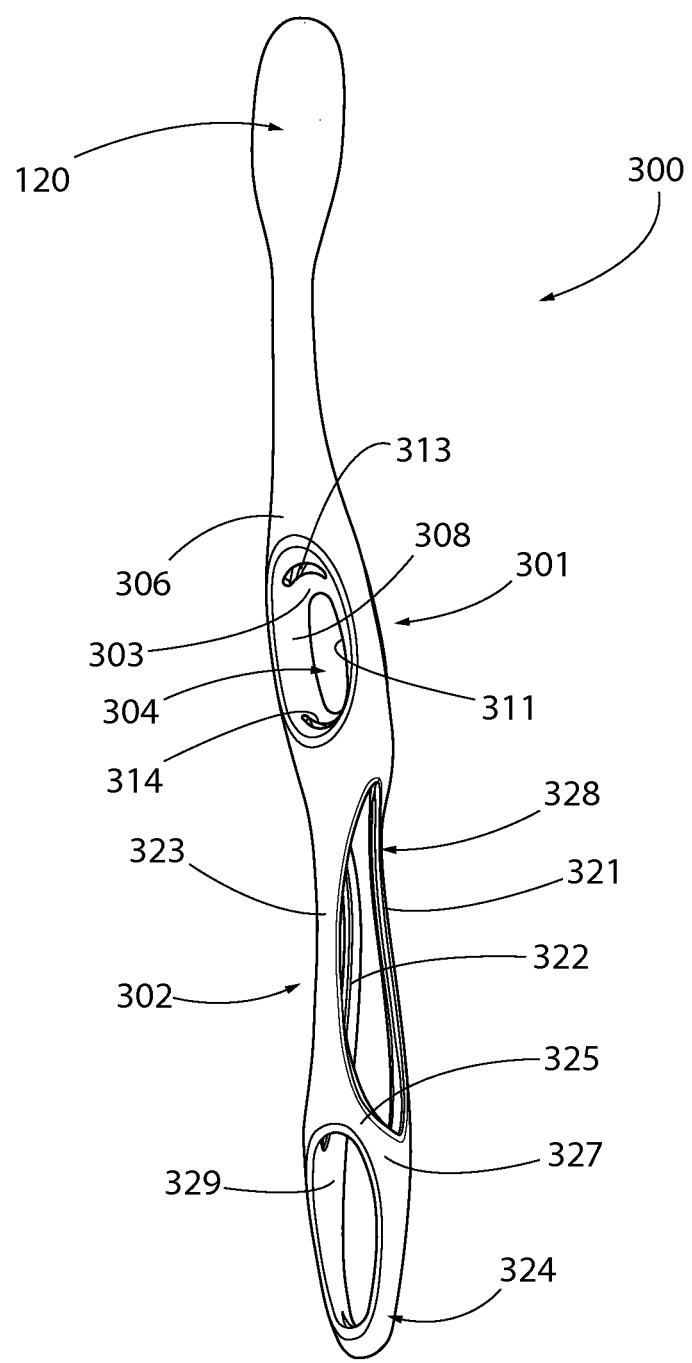
FIG. 10 is a rear perspective view of the second component of FIG. 9.

The set of tooth cleaning elements 130 can be connected to the head 120 in any manner known in the art. In the exemplified embodiment (see FIGS. 9-11), anchor free tufting (AFT) is used to mount the cleaning elements. In this embodiment, the body of the head 120 comprises a depression (or basin) 125 for receiving a cleaning element assembly that comprises a carrier plate to which the tooth cleaning elements 130 are connected prior to being coupled to the body of the head 120. The carrier plate is then positioned within the depression 125 and secured to the body of the head 120, such as by ultrasonic welding, thermal fusion, mechanical fit or adhesion. The bristles (or other elastomeric elements) of the set of tooth cleaning elements 130 extend through the carrier. The free ends of the set of tooth cleaning elements 130 on one side of the carrier plate perform the cleaning function. The ends of the set of tooth cleaning elements 130 on the other side of the carrier plate are melted together by heat, thereby retaining the set of tooth cleaning elements 130 in place.

In other embodiments, the set of tooth cleaning elements 130 can be mounted to tuft blocks or sections by extending through suitable openings in the tuft blocks so that the base of the bristles is mounted within or below the tuft block. In still another embodiment, tuft holes may be formed in the body of the head and staples, or other anchors, can be sued to secure the bristles tufts therein.

While not in the exemplified embodiment, the rear surface 122 of the head 120 may also comprise additional structures for oral cleaning, such as a soft tissue cleanser, in other embodiments. Such soft tissue cleansers are typically constructed of a TPE and include one or more projections, such as nubs and/or ridges, for engaging and massaging soft oral tissue, such as the tongue.

As shown in FIG. 3, the handle 110 can be conceptually delineated in longitudinal sections comprising a proximal section 115, a middle section 116 and a neck section 117. The proximal section 115 is the portion or segment of the handle 110 that generally fits comfortably within the palm of the user. The middle section 116 forms the portion or segment of the handle 110 that generally fits comfortably between the user's thumb and index finger. The neck portion 117 forms the portion or segment of the handle 110 that connects to the head 120.

The proximal section 115 longitudinally extends from the proximal end 101 of the toothbrush 100 to the middle section 116. The middle section 116 longitudinally extends from the proximal section 115 to the neck section 117. The neck section 117 extends from the middle section 116 to the head 120. While the head 120 is illustrated as being widened relative to the neck section 117 of the handle 110, the head 120 could in some constructions simply be a continuous extension or narrowing of the neck section 117 of the handle 110.

As discussed in greater detail below, the first component 200 is located within (and forms a part of) both the proximal section 115 and the middle section 116. The second component 300 is located within (and forms part of) each of the proximal section 115, the middle section 116 and the neck section 117. Moreover, in the exemplified embodiment, the first and third components 200, 400 are not located within the neck section 117. The third component 400 is located (and forms part of) the middle section 116. As exemplified, the third component is only located (and forms part of) in the middle section 116.

Figure 7:
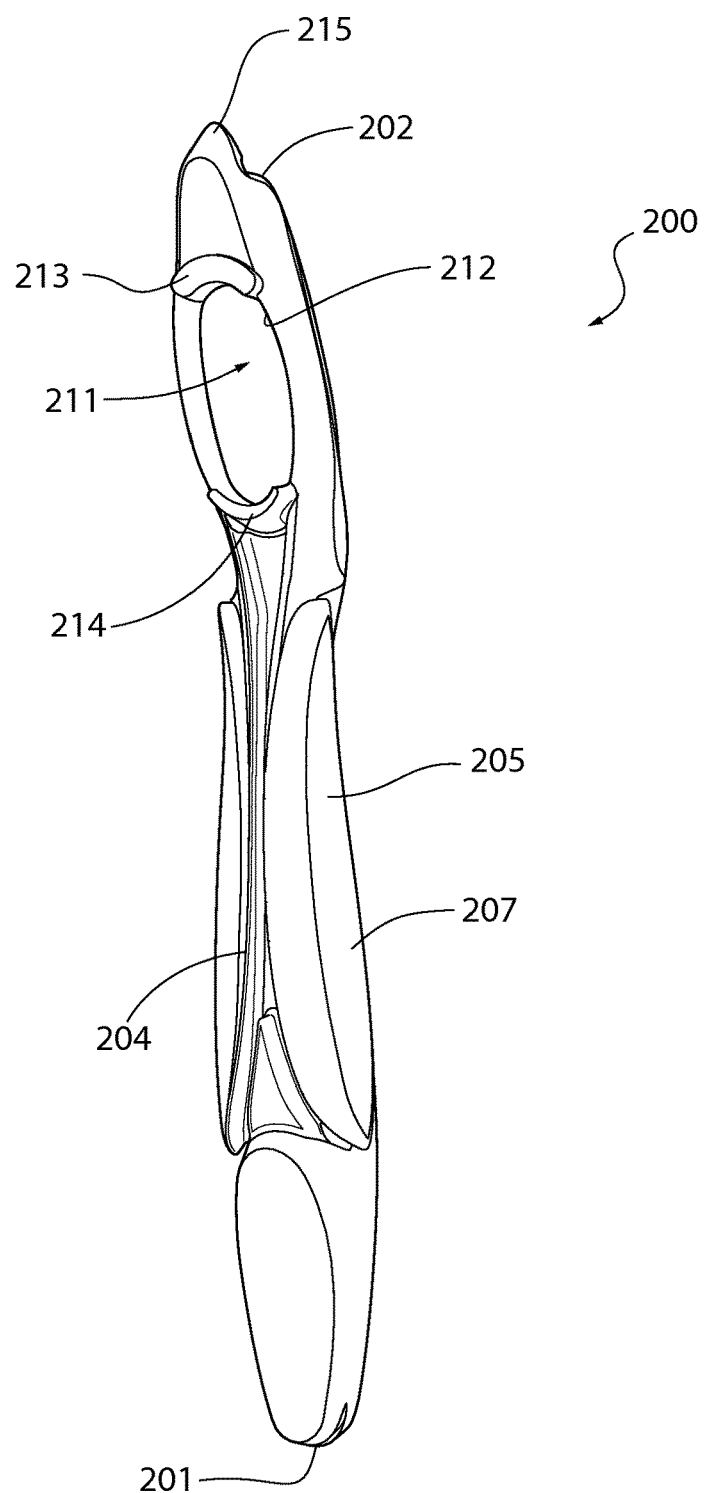
FIG. 7 is a rear perspective view of the first component of FIG. 6.
Figure 8:
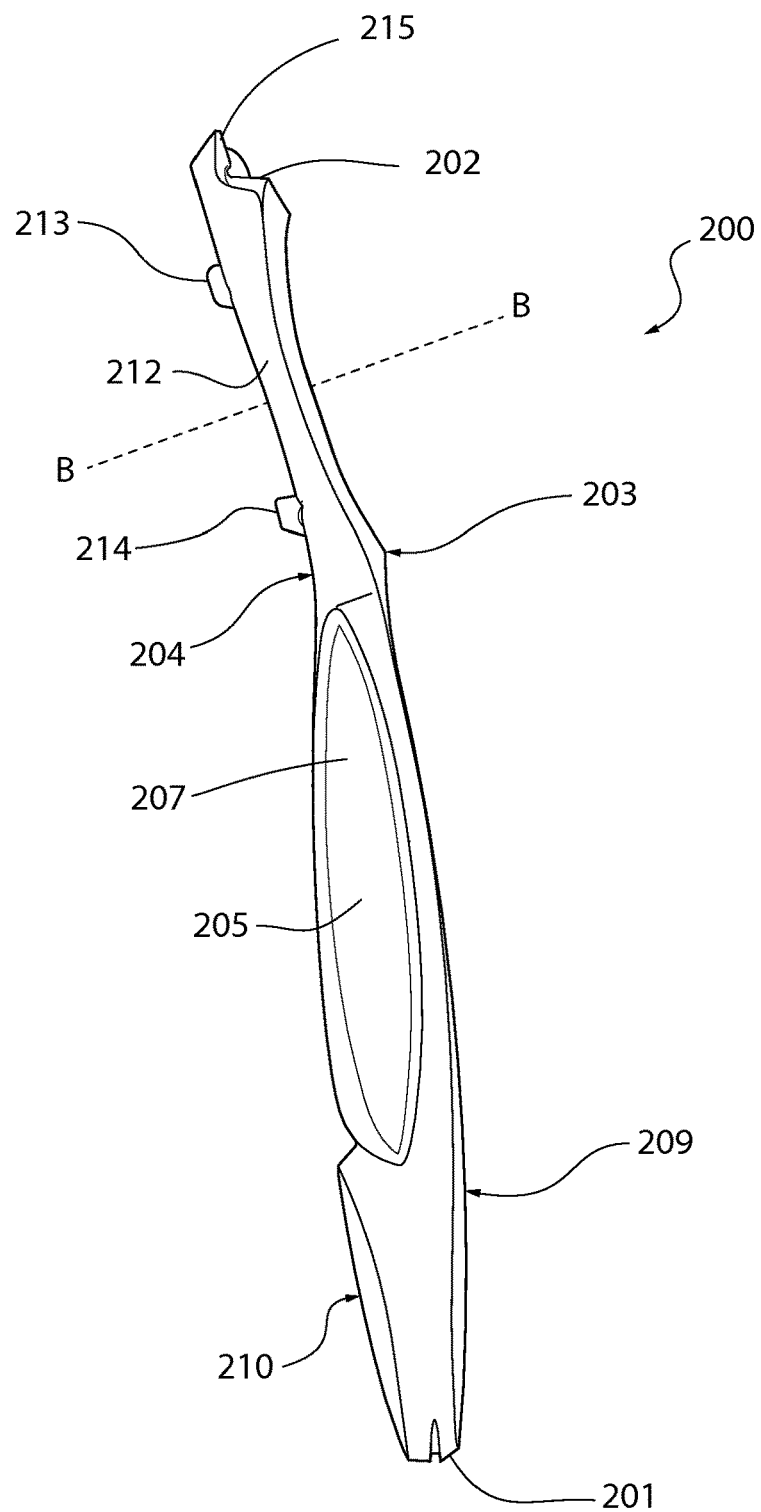
FIG. 8 is a left-side view of the first component of FIG. 6, wherein the right-side view is a mirror image.

Referring now to FIGS. 7-8 concurrently, the handle 110 is illustrated in an exploded state so that its three components are visible. The three components of the handle 110 include a first component 200, a second component 300 and a third component 400. In certain embodiments, the first component 200 can be considered a core structure, the second component can be considered an elongated handle body, and the third component can be considered a grip body. While three components 200, 300, 400 are exemplified as forming the multi-component handle 110 of the toothbrush 100 in the illustrated embodiment, in other embodiments of the multi-component handle 110 of the toothbrush 100, the third component 400 may be omitted if desired. In one such embodiment, the second component 300 can be modified to assume the volume of the omitted third component 400. In still another such embodiment, the first component 200 can be modified to assume the volume of the omitted third component 400. In still other embodiments, the multi-component handle 110 of the toothbrush 100 may further comprise an additional component (in addition to the first, second and third components 200, 300, 400), such as a thermoplastic elastomer overlay, which is commonly referred to in the art as a grip cover.

In one embodiment, each of the first, second and third components 200, 300, 400 is an integrally formed single-component structure. One suitable forming method for forming the first, second and third components 200, 300, 400 is injection molding. Of course, in certain other embodiments, other forming techniques may be utilized, such as machining and/or milling. In one embodiment, the first component 300 is formed of a first hard plastic, the second component 400 is formed of a second hard plastic, and the third component 400 is formed of an elastomeric material.

Suitable first hard plastics for formation of the first component 200 include polyethylene, polyethylene terephthalate, polypropylene (PP), polyamide, polyester, cellulosics, SAN, acrylic, ABS, BR or any other of the hard plastics used in toothbrush manufacture. Suitable second hard plastics include polyethylene, polypropylene (PP), polyamide, polyester, cellulosics, SAN, acrylic, ABS, BR or any other of the hard plastics used in toothbrush manufacture. As used herein, the term "plastic" may include a blend of different plastics or a copolymer. The third component 400 is constructed of a first elastomeric material, such as a thermoplastic elastomer (TPE). In certain embodiments, the first elastomeric material of the third component may have a hardness durometer in a range of A11 to A15 Shore hardness. Of course, materials outside this hardness range could be used. As an example, one potential first elastomeric material for the third component 400 can be styrene-ethylene/butylene-styrene (SEBS) manufactured by GLS Corporation. Nevertheless, other manufacturers can supply the SEBS material and other materials could be used.

In one embodiment, the first hard plastic is different than the second hard plastic. In an even more specific embodiment, the first hard plastic and the second hard plastic are different hard plastics that are chemically incompatible with one another such that they do not form a chemical bond with each other during an injection molding process.

In certain embodiments, the hard plastic that forms one of the first and second components is an opaque hard plastic while the hard plastic that forms the other one of the first and second components is a transparent (or light transmissive)

hard plastic. As used herein, the term "transparent hard plastic" includes hard plastics that are color tinted but still allow light to transmit therethrough. Suitable transparent hard plastics include without limitation clarified PP and clear polyesters, such as polyethylene terephthalate or a copolyester, such as poly-cyclohexylene dimethylene terephthalate, acid modified, polyester (PCTA) or styrene acrylonitrile (SAN), acrylonitrile butadiene styrene (ABS), polymethyl methacrylate (PMMA) or a cellulosic plastic, such as cellulose acetate propionate (CAP). One suitable opaque hard plastic is opaque PP. However, opaque versions of the hard plastics listed above for the first and second hard plastics may also be used.

In one specific embodiment, the first hard plastic of the first component 200 is a transparent hard plastic while the second hard plastic of the second component 300 is an opaque hard plastic. In one such embodiment, the first hard plastic of the first component 200 can be a transparent BR while the second hard plastic of the second component 300 can be an opaque PP.

In one embodiment, the first elastomeric material of the third component 400 and the second hard plastic of the second component 300 are selected so as to be chemically compatible with one another such that so that a chemical bond is formed between the first elastomeric material and the second hard plastic during an injection molding process. In one such specific embodiment, the first elastomeric material can be a TPE while the second hard plastic can be PP.

Referring now to FIGS. 4-8 concurrently, the first component 200 and its structural cooperation with the second and third components 300, 400 will be described in greater detail. The first component 200 is an elongated structure that, when assembled within the handle 110 of the toothbrush, extends along the longitudinal axis A-A (see FIG. 3). The first component 200 extends longitudinally from a proximal end 201 to a distal end 202. The first component 200 comprises a front outer surface 203, a rear outer surface 204, a left-side outer surface 205, and a right-side outer surface 206. As will be discussed in greater detail below, when the handle 110 of the toothbrush 100 is fully assembled (as shown in FIGS. 1-3) portions of each of the front outer surface 203, the rear outer surface 204, the left-side outer surface 205, and the right-side outer surface 206 remain exposed. Moreover, in certain embodiments where the first hard plastic is a transparent hard plastic, a first window 250 may be formed through the handle 110 via exposed portions 207, 208 of the first component 200 from the first and second opposing outer surfaces 111, 112 of the handle 110 (which are the lateral surfaces) (see FIG. 13). Additionally, a second window 260 may be formed through the handle 110 via exposed portions 209, 210 of the first component 200 from the third and fourth opposing outer surfaces 113, 114 of the handle 110 (which are the front and rear surfaces) (see FIG. 13).

The first component 200 comprises a first component aperture 211. As discussed in greater detail below, the first component aperture 211 is provided to receive an anchor 303 of the second component 300 when the handle 110 is assembled. As will become apparent from the below discussion, the mechanical cooperation between the anchor 303 of the second component 300 and a sidewall 212 that defines the first component aperture 211 assists in ensuring a secure coupling between the first and second components 200, 300, especially when the first and second components 200, 300 are formed of chemically incompatible hard plastics as described above.

In the exemplified embodiment, the first component aperture 211 is a through-hole that extends between the front outer surface 203 and the rear outer surface 204 of the first component 200. In other embodiments, the first component aperture 211 may be a blind hole extending into the front outer surface 203 of the first component 200 or a blind hole extending into the rear outer surface 204 of the first component 200.

The first component aperture 211 extends along a first axis B-B. When the handle 110 is assembled, the first axis B-B is transverse to the longitudinal axis A-A. In one specific embodiment, the first axis B-B may be substantially orthogonal to the longitudinal axis A-A. In the exemplified embodiment, the sidewall 212 comprises an annular structure that circumferentially surrounds the first component aperture 211 about the first axis B-B. This annular structure terminates in an upper annular surface 216 that remains exposed when the handle 110 is assembled.

Figure 11:
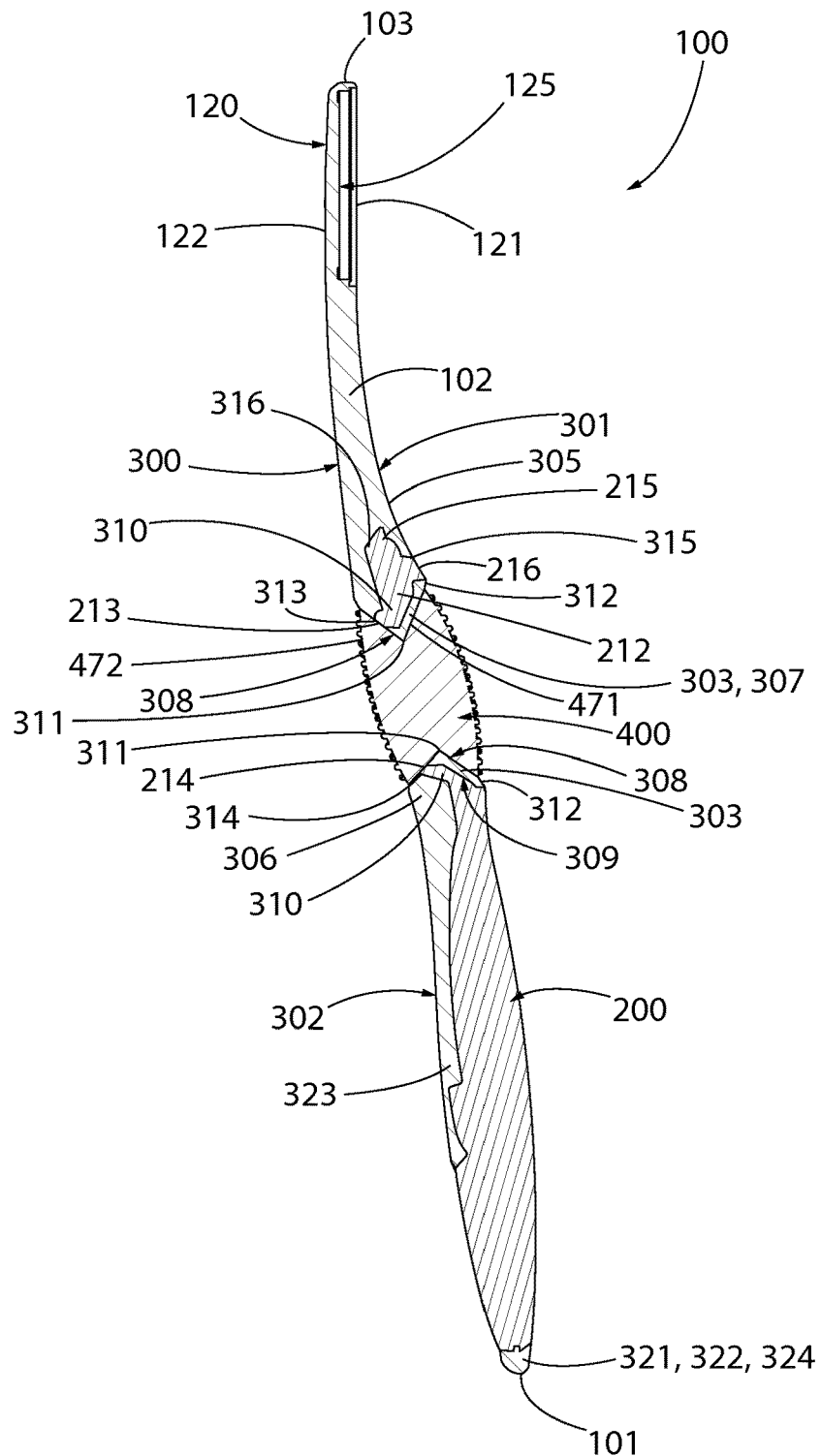
FIG. 11 is longitudinal cross-sectional view of the oral care implement of FIG. 1 taken along view XI-XI of FIG. 3, wherein the tooth cleaning element assembly has been omitted.

The sidewall 212 of the first component 200 comprises a first transverse protuberance 213 and a second transverse protuberance 214 located adjacent the first component aperture 211 and extending from the rear outer surface 204 of the first component 200. The first and second transverse protuberances 213, 214 are circumferentially spaced apart from one another about the first axis B-B. In the exemplified embodiment, the first and second transverse protuberances 213, 214 are located on opposite sides of the first component aperture 211 but may be at other locations in other embodiments. When the handle 110 is assembled, the first and second transverse protuberances 213, 214 respectively extend into first and second transverse openings 313, 314 of the anchor 303 (shown in FIG. 11). Moreover, when the handle 110 the first and second transverse protuberances 213, 214 are located on opposite sides of the second component aperture 304 of the second component 300. As seen in FIG. 11, the first and second transverse protuberances 213, 214 extend through the first and second transverse openings 313, 314 to form portions of an inner surface that defines the second component aperture 304 (discussed in greater detail below). As a result of the above mechanical cooperation, the first and second transverse protuberances 213, 214 further assist in ensuring a secure coupling between the first and second components 200, 300. While in the exemplified embodiment, two transverse protuberances 213, 214 are exemplified, in other embodiments more or less than two transverse protuberances may be used. In still other embodiments, the transverse protuberances may be omitted all together.

Figure 12:
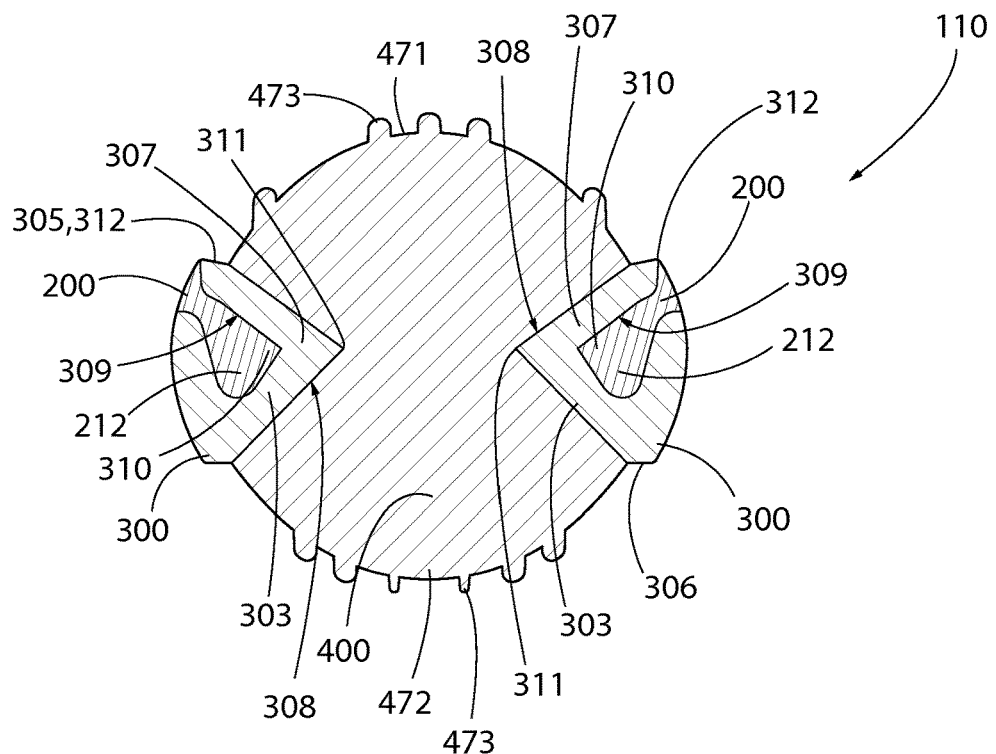
FIG. 12 is transverse cross-sectional view of the oral care implement of FIG. 1 taken along view XII-XII of FIG. 3.

As can also be seen in FIGS. 11 and 12, the sidewall 212 of the first component nests within a groove 310 formed in an outer surface 309 of the anchor 303 of the second component 300, thereby further assisting in ensuring a secure coupling between the first and second components 200, 300.

The first component 200 further comprises a longitudinal protuberance 215 extending from the distal end 202 of the first component 200. When the handle 110 is assembled, the longitudinal protuberance 215 extends into a longitudinal recess 316 formed in a transverse wall 315 of the second component 300 (see FIG. 11). When the handle 110 is assembled, the longitudinal protuberance 215 is embedded within the second component 300.

Referring now to FIGS. 4-5 and 9-12, certain structural details of the second component 300 will be described, along with its structural cooperation with the first and third components 200, 400. The second component 300 is an elongated handle structure that generally comprises a body portion 301 and a strap network 302 extending longitudinally from the body portion 301. The body portion 301 further comprises an anchor 303 which, as discussed above, extends into the first component opening 211 when the handle 110 is assembled.

The body portion 301 is located within (and forms part of) the middle section 116 and neck section 117 of the handle 110 while the strap network 302 is located within (and forms part of) the proximal middle section 115 of the handle 110 (see FIG. 3). The body portion 301 also comprises the head 120 of the toothbrush 110 in the exemplified embodiment as discussed above.

The anchor of the second component 300 comprises a second component aperture 304. In the exemplified embodiment, the second component aperture 304 is a through-hole that extends between a front outer surface 305 and a rear outer surface 306 of the second component 300. In other embodiments, the second component aperture 304 may be a blind hole extending into the front outer surface 305 of the second component 300 or a blind hole extending into the rear outer surface 306 of the second component 300.

The second component aperture 304 extends along a second axis C-C. When the handle 110 is assembled, the second axis C-C is transverse to the longitudinal axis A-A. In one specific embodiment, the second axis C-C may be substantially orthogonal to the longitudinal axis A-A. In certain embodiments, when the handle 100 is assembled, the first and second axes B-B, C-C may be substantially parallel to one another and/or substantially coextensive.

In the exemplified embodiment, the second component aperture 304 has a cross-sectional area (measured transverse to the second axis B-B) that tapers with increasing depth from the opposing front and rear outer surfaces 305, 306 of the second component 300. As a result an apex edge 311 is formed that is embedded by the third component 400 within the handle 100. This structure assists with retaining the third component 400 within the second component aperture 304. In other embodiments, however, the cross-sectional area of the second component aperture 304 (measured transverse to the second axis B-B) may be substantially constant, may be stepped, or may increase and decrease in a repetitive manner.

In the exemplified embodiment, the anchor 304 comprises a sidewall 307 that defines an annular structure that circumferentially surrounds the second component aperture 304 about the second axis C-C. The sidewall 307 comprises an inner surface 308 that defines the second component aperture 304 and an outer surface 309. A groove 310 (or channel) is formed into the outer surface 309 of the anchor 304. As discussed above, the sidewall 212 of the first component 200 nests within the groove 310 when the handle 110 is assembled.

The sidewall 307 (which defines an annular structure in the exemplified embodiment) comprises an upper surface 312 that remains exposed on the front outer surface 104 of the handle 110. Additionally, when the handle 110 is assembled, the sidewall 307 of the anchor 303 isolates the third component 400 from the first component 200 (best shown in FIGS. 11-12), with the exception of the terminal surfaces of the transverse protuberances 213, 214 of the first component 200.

As mentioned above, the sidewall 307 of the anchor 303 comprises first and second transverse openings 313, 314 that extend from the inner surface 308 to the outer surface 309. These first and second transverse openings 313, 314 are provided to receive the first and second transverse protuberances 213, 214 of the first component 200 when the handle 110 is assembled (see FIG. 11). As can be seen, in this embodiment, the terminal surface of the first and second transverse protuberances 213, 214 form portions of the inner surface that defines the second component aperture 304 of the anchor 303. While in the exemplified embodiment, two transverse openings 313, 314 are exemplified, in other embodiments more or less than two transverse openings may be used. In still other embodiments, the transverse openings may be omitted all together.

As shown in FIG. 11, the second component 300 further comprises an internal transverse wall 315. A longitudinal recess 316 is formed into the transverse wall 315 of the second component 300. When the handle 110 is assembled, the longitudinal protuberance 215 of the first component 200 extends into and is located within the longitudinal recess 316, thereby assisting in ensuring a secure coupling between the first and second components 200, 300. In the exemplified embodiment, the longitudinal protuberance 215 is embedded within the handle 110.

Referring now to FIGS. 4-5 and 9-15, the second component 300 further comprises the strap network 302. The strap network 302 is formed by a plurality of strips that, when the handle is assembled, wraps around the first component 200 to assist with ensuring that first and second components 200, 300 are securely coupled together.

In the exemplified embodiment of the strap network 302, the strap network 302 comprises a first longitudinal strip 321, a second longitudinal strip 322 and a third longitudinal strip 323. As can best be seen in FIGS. 13-14, when the handle 110 is assembled the first, second and third longitudinal strips 321, 322, 333 are arranged about the first component 200 in a circumferentially spaced-apart manner about the longitudinal axis A-A. In one embodiment, the first, second and third strips 321, 322, 323 may be substantially equi-spaced from one another. In another embodiment, the spacing between first, second and third strips 321, 322, 323 may not be substantially equal.

The first strip 321 extends longitudinally from the body portion 301 of the second component 300 toward the proximal end 101 of the handle 110 until it joins with the second strip 322 at the proximal end 101. Similarly, the second strip 322 extends longitudinally from the body portion 301 of the second component 300 toward the proximal end 101 of the handle 110 until it joins with the first strip 321 at the proximal end 101. As a result, the first and second strips 321, 322 collectively form a first strap 324 that wraps around the proximal end 201 of the first component 200, and also forms a portion of the proximal end 101 of the handle 110.

The third strip 323 also extends longitudinally from the body portion 301 of the second component 300 toward the proximal end 101 of the handle 110. However, as a distance from the proximal end 101 of the handle, the third strip divides/branches into a first branch 325 and a second branch 326. The first branch 325 of the third strip 323 converges with the first strip 321 at a first strap node 327. As a result, the third strip 323 and the first strip 321 collectively form a second strap 328 that forms a loop (in conjunction with the body portion 301) on a first lateral surface 111 of the handle 110. Similarly, the second branch 326 of the third strip 323 converges with the second strip 322 at a second strap node 329. As a result, the third strip 323 and the first strip 321 collectively form a third strap 330 that forms a loop (in conjunction with the body portion 301) on a second lateral surface 112 of the handle 110. Additionally, as can be seen, the first, second and third straps 321, 322, 323 also collectively form a loop 331 on the rear outer surface 114 of the handle 110. It is to be noted that while one embodiment of a strap network 302 is exemplified, the strap network 302 can take on a wide range of potential structural manifestations.

Figure 13:
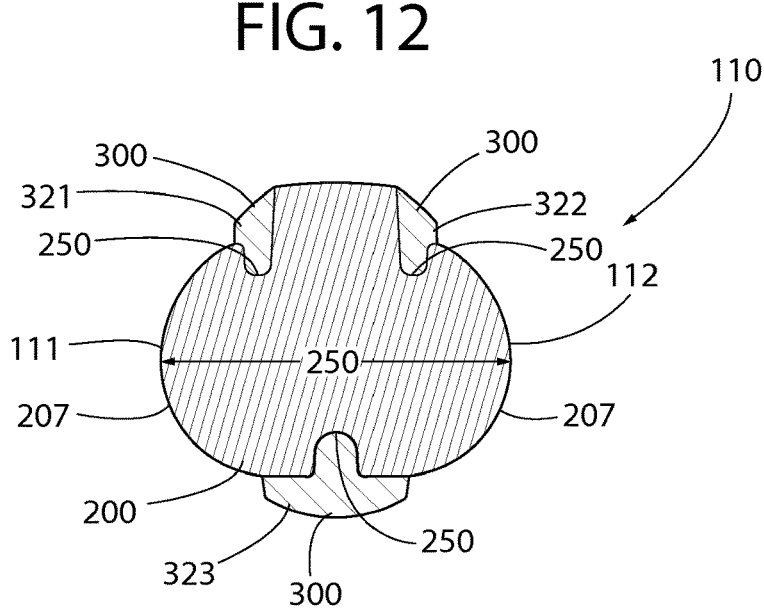
FIG. 13 is transverse cross-sectional view of the oral care implement of FIG. 1 taken along view XIII-XIII of FIG. 3.
Figure 15:
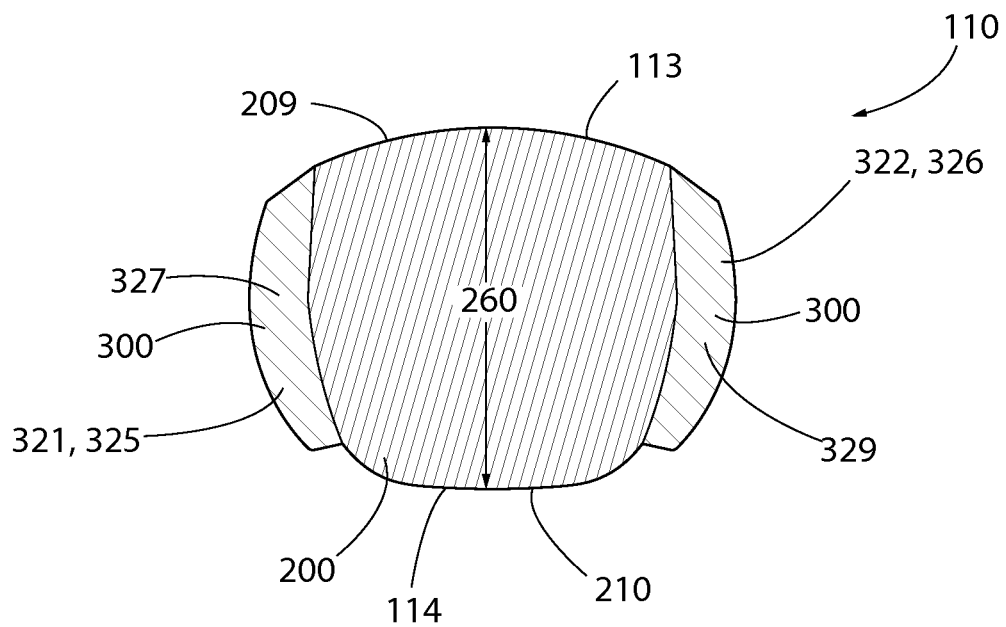
FIG. 15 is transverse cross-sectional view of the oral care implement of FIG. 1 taken along view XV-XV of FIG. 3.

Referring now to FIGS. 13 and 15 concurrently, when the first component 200 is constructed of a first hard plastic that is substantially transparent and the second component 300 is constructed of a second hard plastic that is substantially opaque, the plurality of strips 321, 322, 323 define a first window 250 through the first component 200 from first and second lateral surfaces 111, 112 of the handle 110 and a second window 260 through the front and rear surfaces 113, 114 of the handle 110.

Figure 14:
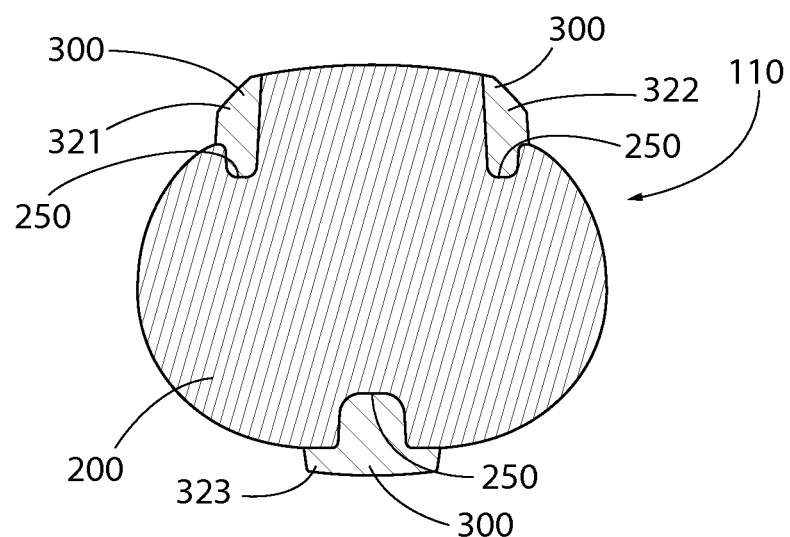
FIG. 14 is transverse cross-sectional view of the oral care implement of FIG. 1 taken along view XIV-XIV of FIG. 3.

Referring now to FIGS. 13 and 14 concurrently, the first component 200 is provided with a plurality of grooves 250 that are formed into the outer surface of the first component 200. These grooves 250 are provided so that when the handle 110 is assembled, the plurality of strips 321, 322, 323 are located therein, thereby further assisting with ensuring that secure coupling is achieved between the first and second components 200, 300, even when chemically incompatible materials are used.

While the exemplified embodiment of the toothbrush 100 has a second component 300 that comprises both the anchor 303 and the strap network 302, in certain embodiments the strap network 302 may be omitted. In still other embodiments, the anchor 303 may be omitted. In such embodiments, corresponding modifications can be made to the first component 200 to compensate for said omissions. For example, if the anchor 303 is omitted, the third component 400 may be located directly in the first component aperture 211.

Turning now to FIGS. 1-2, 5 and 11-12 concurrently, the third component 400 will be described in greater detail. The third component 400 is a generally bulbous shaped body that bulges out of the apertures 211, 304 of the first and second components 200, 300. The third component 400 fills the second component aperture 304 of the second component 300 and, thus, takes on the shape of the second component aperture 304. The third component 400 has a convex front surface 471 and a convex rear surface 472, which resemble an oval or elliptical shape. The bulbous shape of the third component 400 enables the user to reliably roll and control the handle 110 between the thumb and index fingers during use. The third component 400 may also be non-bulging or have any number of shapes, such as circular, a true oval shape and the like.

In one preferred construction, the third component 400 has a multiplicity of finger grip protrusions 473 projecting from the front and rear surfaces 471, 472. The finger grip protrusions 473 provide a tactile feature to increase the friction on the user's finger surfaces and thus enhance the user's ability to grip the handle 110, particularly under wet conditions. The finger grip protrusions 473 are preferably provided in a desired conical or frusto-conical shape for improved grip performance. In other embodiments, other roughened surfaces and geometries could be used.

A method of manufacturing the toothbrush 100 according to one embodiment of the present invention will be described. The first component created in manufacturing the toothbrush 100 is the first component 200. To create the first component 200, a first mold is provided having a first mold cavity and at least one port/nozzle for injecting the first hard plastic in a liquefied state into the first mold cavity. In one embodiment, a single port is used to inject the liquefied first hard plastic, which may be BR. The first mold cavity has a volume that is sized and shaped to correspond to the first component 200 as described above and illustrated herein.

The first mold may be two-part mold, as is known in the art. Once the first mold cavity is created/provided, liquefied first hard plastic is injected into the first mold so as to fill the first mold cavity. The liquefied first hard plastic is allowed to cool to an appropriate temperature so as to form the first component 200, as described above and illustrated herein, for further handling.

Once the first component 200 is created (and allowed to adequately cool for further handling), the first component 200 is supported by one or more clamping members that engage one or more points of contact on first component 200 with at least one set of arms.

Once the clamping member is properly supporting the first component 200, the first component 200 is positioned within a second mold cavity of a second mold. This positioning can be effectuated by either moving the first component 200 into the second mold cavity or by creating the second mold cavity about the first component 200 while supporting the first component 200 in a stationary manner, which can be accomplished by translating and mating multiple pieces of the second mold into position so that the second mold cavity is formed about the first component 200. The second mold cavity has a volume that is sized and shaped to correspond to the second component 300. One or more ports are present in the second mold for injecting the second hard plastic in a liquefied state into the second mold cavity. In one embodiment, a single port is used to inject the liquefied PP.

Once the first component 200 is in proper position within the second mold cavity (and the second mold cavity is adequately sealed), the liquefied second hard plastic (which may be PP) is injected into the second mold cavity so as to fill the remaining volume of the second mold cavity that is not occupied by the first component 200. The liquefied second hard plastic forms the strap network 302 about the first component 200 and the anchor 303 within the first component aperture 211 (as described above).

The liquefied second hard plastic is then allowed to cool to an appropriate temperature, thereby forming the second component 300 about the first component 200, as described above. The first component 200 and second component 300 collectively form a handle assembly. If the first and second plastics are selected so as to be chemically incompatible with one another, the second hard plastic of second component 300 does not chemically bond with the first hard plastic of the first component 400 during the injection molding process.

Once the handle assembly is sufficiently cool for further handling, at least the middle section 116 is positioned within a third mold cavity of a third mold. When in the third mold cavity, the first elastomeric material in a liquefied state is injected therein to fill the second component aperture 304, which is enclosed by an appropriate mold, via a port. The first elastomeric material, in one embodiment, chemically bonds with the second hard plastic of the second component 300 during this injection molding process.

The inventive aspects discussed above may be practiced for a manual toothbrush or a powered toothbrush. In operation, the previously described features, individually and/or in any combination, may improve the control, grip performance, aesthetics and cost point of oral implements. Other constructions of toothbrush are possible. For example, the head 120 may be replaceable or interchangeable on the handle 110. The head 120 may include various oral surface engaging elements, such as inter-proximal picks, brushes, flossing element, plaque scrapper, tongue cleansers and soft tissue massages. While the various features of the toothbrush 100 work together to achieve the advantages previously described, it is recognized that individual features and sub-combinations of these features can be used to obtain some of the aforementioned advantages without the necessity to adopt all of these features in an oral care implement.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care implement comprising:
a handle extending along a longitudinal axis;
a head at the distal end of the handle;
at least one tooth cleaning element extending from the head;
the handle comprising:
a first component constructed of a first hard plastic; and
a second component constructed of a second hard plastic, the second component comprising a body portion and a plurality of strips extending from the body portion and forming a strap network that wraps around the first component.

2. The oral care implement according to claim 1 wherein the second component comprises the head.

3. The oral care implement according to claim 1 wherein the plurality of straps extends longitudinally from the body portion toward the proximal end of the handle.

4. The oral care implement according to claim 1 wherein the first component comprises a longitudinal protuberance extending from a distal end of the first component, the second component comprising a longitudinal recess in a transverse wall of the second component, and the longitudinal protuberance located within the longitudinal recess.

5. The oral care implement according to claim 1 wherein the plurality of strips comprises a first longitudinal strip, a second longitudinal strip and a third longitudinal strip.

6. The oral care implement according to claim 5 wherein the third strip branches into a first branch that converges with the first strip and a second branch that converges with the second strip.

7. The oral care implement according to claim 5 wherein the first and second strips collectively form a first strap that wraps around a proximal end of the first component.

8. The oral care implement according to claim 5 wherein the first and third strips collectively form a second strap that forms a loop on a first lateral surface of the handle.

9. The oral care implement according to claim 5 wherein the second and third strips collectively form a third strap that forms a loop on a second lateral surface of the handle.

10. The oral care implement according to claim 1 wherein the strap network comprises at least one strap that wraps around a proximal end of the first component.

11. The oral care implement according to claim 1 wherein the first component comprises a plurality of grooves formed into an outer surface of the first component, the plurality of strips located within the plurality of channels.

12. The oral care implement according to claim 1 wherein the first hard plastic is substantially transparent and the second hard plastic is substantially opaque.

13. The oral care implement according to claim 12 wherein the plurality of straps define a first window through the first component from first and second opposing outer surfaces of the handle; and wherein the plurality of straps define a second window through the third and fourth opposing outer surfaces of the handle.

14. The oral care implement according to claim 13 wherein the first outer surface of the handle is a first lateral surface of the handle, the second outer surface of the handle is a second lateral surface of the handle; the third outer surface of the handle is a front surface of the handle, and the fourth outer surface of the handle is a rear surface of the handle.

15. The oral care implement according to claim 1 wherein the first component comprises a first component aperture and the second component comprises an anchor that extends into the first component aperture, the anchor comprises a second component aperture, and wherein the handle further comprises a third component disposed within the second component aperture.

16. The oral care implement according to claim 1 wherein the first hard plastic and the second hard plastic are chemically incompatible with one another such that a chemical bond is not formed between the first and second plastics during an injection overmolding process.

17. An oral care implement comprising:
a handle;
a head coupled to the handle;
at least one tooth cleaning element extending from the head;
the handle comprising:
a first component constructed of a first hard material; and
a second component constructed of a second hard material, the second component comprising a plurality of strips that collectively form a strap network that wraps around the first component.

* * * * *